United States Patent
Perrot

[11] Patent Number: 5,934,834
[45] Date of Patent: Aug. 10, 1999

[54] MACHINE FOR MAKING GROOVES IN THE GROUND

[75] Inventor: Roger Perrot, Brissarthe, France

[73] Assignee: S.D.T.O., Brissarthe, France

[21] Appl. No.: 08/997,873

[22] Filed: Dec. 24, 1997

[51] Int. Cl.[6] ............................................. F16L 1/00
[52] U.S. Cl. ........................ 405/180; 405/174; 299/40.1
[58] Field of Search .................... 405/183, 182, 405/181; 299/40.1; 404/89, 93

[56] References Cited

U.S. PATENT DOCUMENTS

| | | | |
|---|---|---|---|
| 3,271,079 | 9/1966 | Simmons | 299/40.1 |
| 3,394,554 | 7/1968 | Kinnan | 405/183 |
| 3,408,823 | 11/1968 | Okita et al. | 405/183 X |
| 3,566,932 | 3/1971 | Papenmeier . | |
| 4,247,148 | 1/1981 | Eriksson . | |
| 4,331,362 | 5/1982 | Talbert | 299/40.1 X |
| 4,790,687 | 12/1988 | Wright | 405/182 |
| 5,320,451 | 6/1994 | Garvey et al. | 405/181 |

FOREIGN PATENT DOCUMENTS

| | | | |
|---|---|---|---|
| 0154957 | 9/1985 | European Pat. Off. | 299/40.1 |
| 2 425 502 | 12/1979 | France . | |
| 2 626 908 | 11/1989 | France . | |
| 3 022 317 | 12/1981 | Germany . | |
| 0161219 | 10/1982 | Japan | 405/181 |

*Primary Examiner*—Dennis L. Taylor
*Attorney, Agent, or Firm*—Fisher, Christen & Sabol

[57] ABSTRACT

According to the invention:
said machine comprises:
- a base plate (8) through which a segment of a disk (4) can pass, said base plate preventing matter from the grooves from being thrown outward;
- means firmly pressing said base plate and said disk against the ground; and the disk (4) is mounted so that it can rotate freely, so as to make in the ground, without removing matter, a recess that corresponds to said groove.

11 Claims, 3 Drawing Sheets

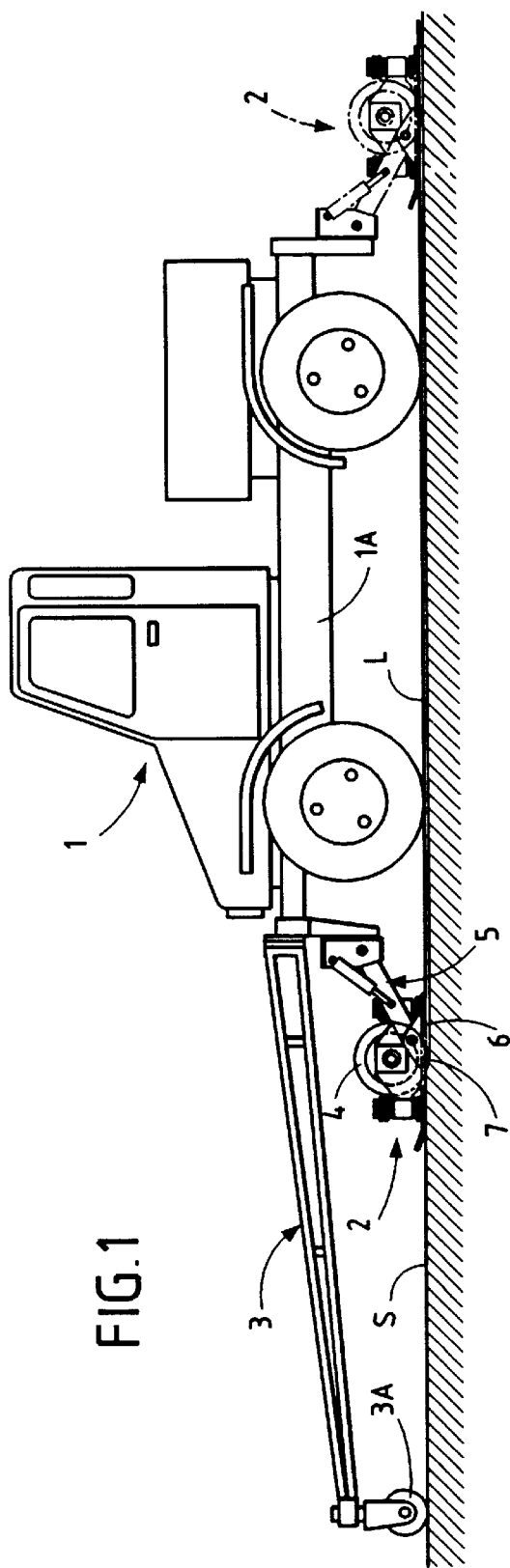
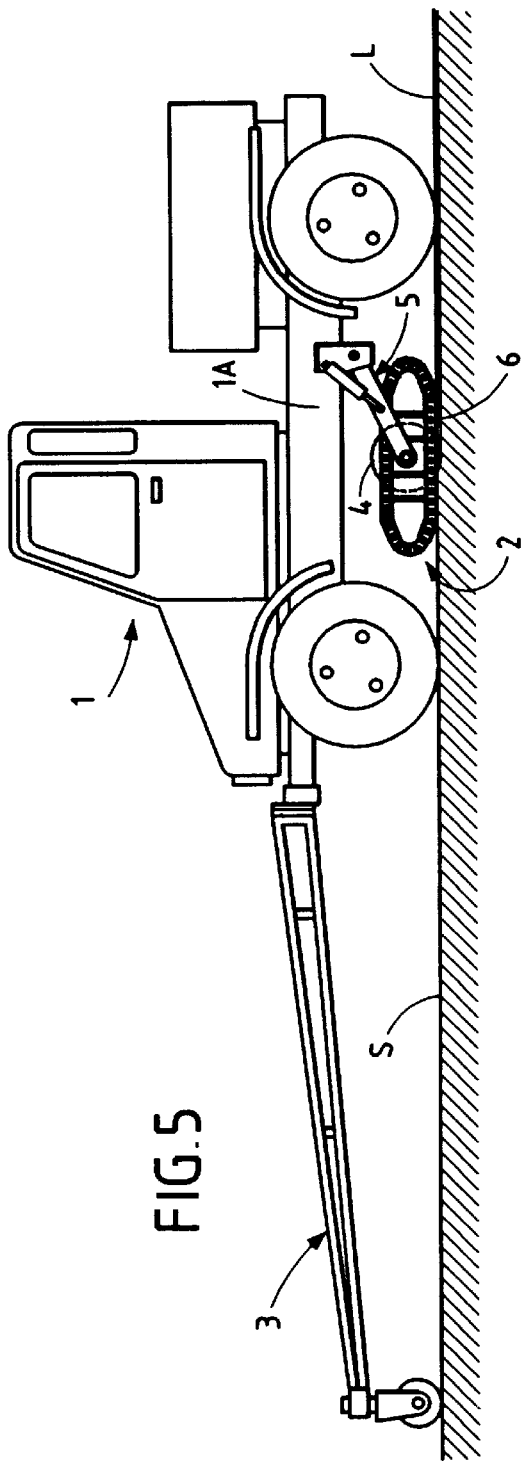

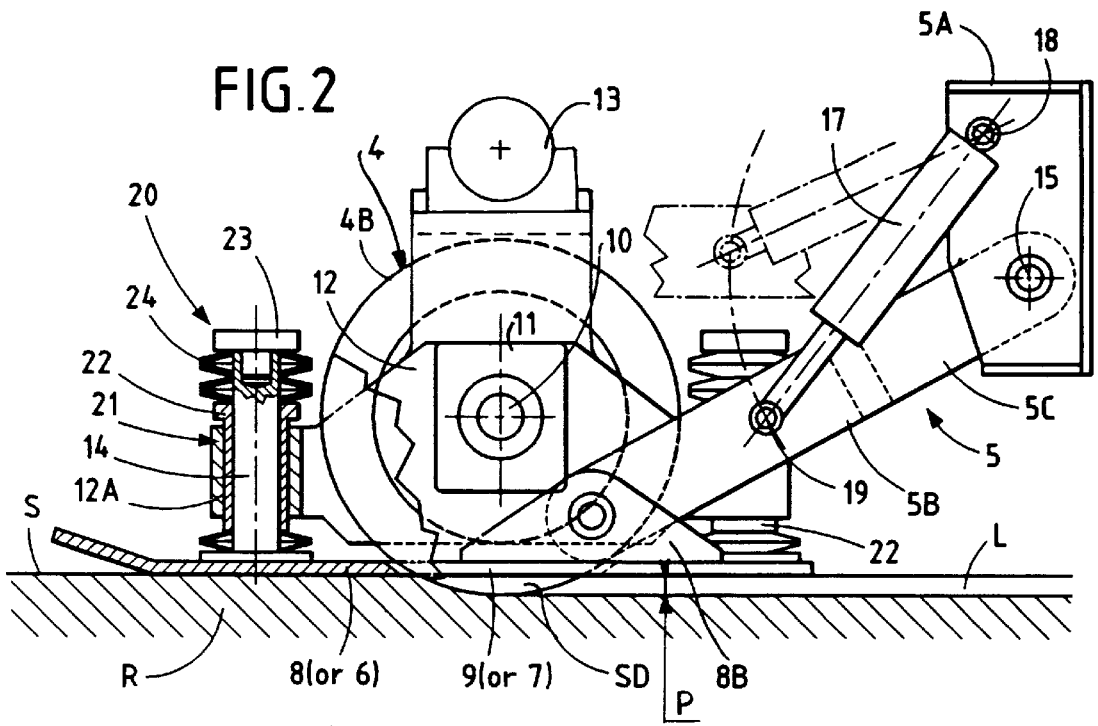
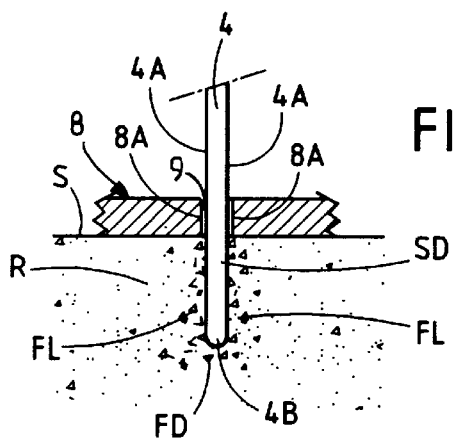
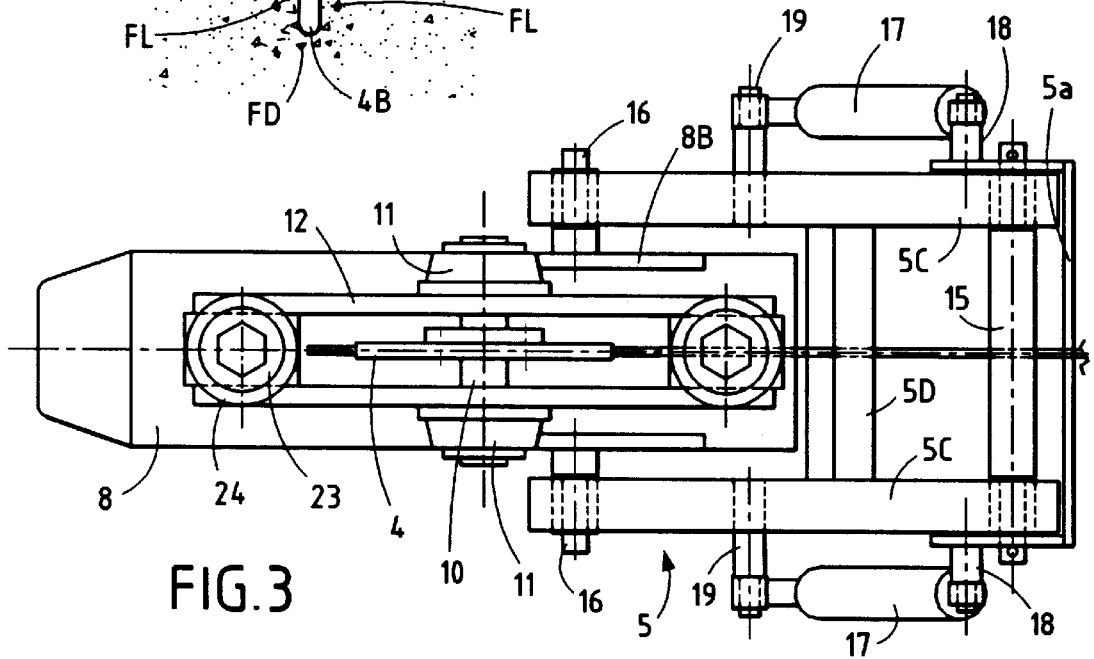

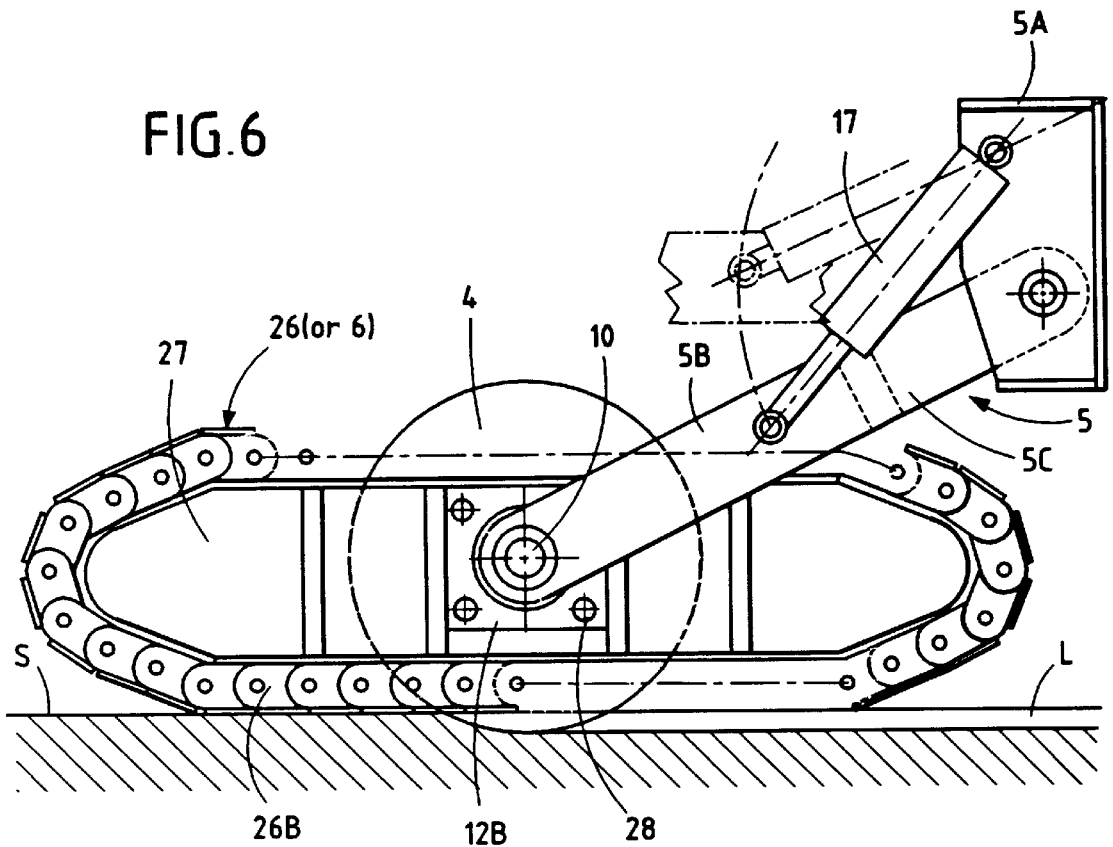
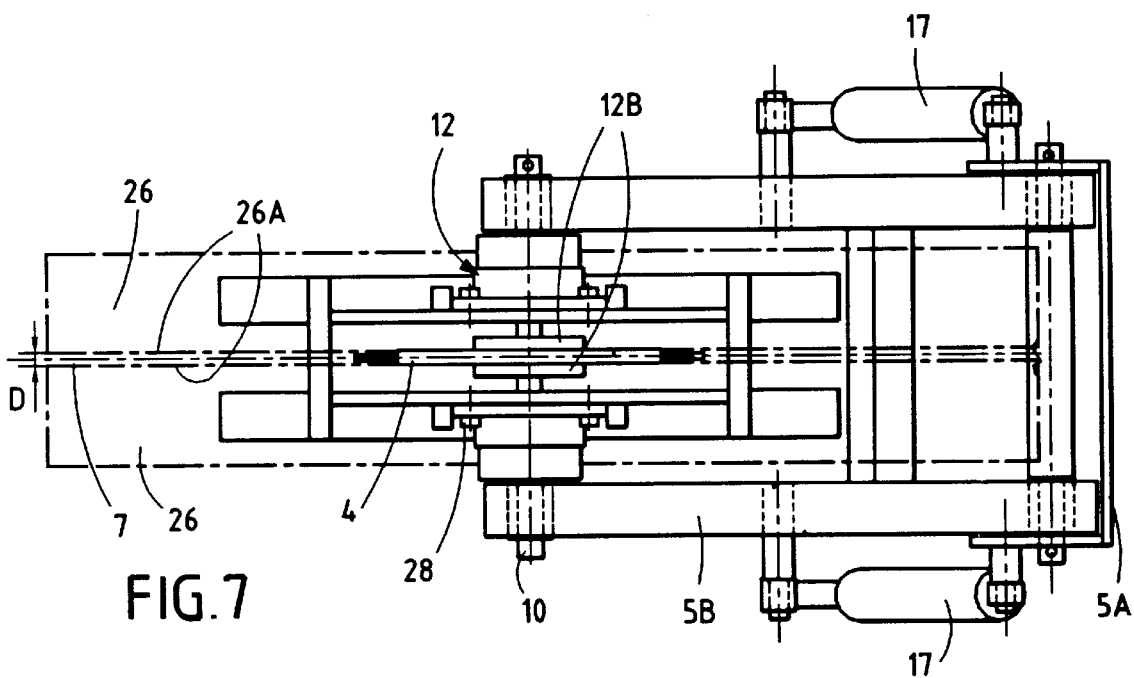

MACHINE FOR MAKING GROOVES IN THE GROUND

The present invention relates to a machine for making grooves in the ground.

Although not exclusively, the machine in accordance with the invention is particularly suitable for making grooves in relatively soft compressible matter such as road surfaces which generally consist of asphalt (based on tar or bitumen) or similar matter, so that elongate objects, such as fiber-optic and/or electric cables can be laid therein.

There are already known, for example from documents FR-A-2 425 502 and DE-A-30 22 317, machines which comprise a cutting disk driven in rotation and borne by a mobile chassis. As the chassis moves along, the rotary cutting disk cuts into the ground and gradually cuts a line of the required depth in this ground.

Such machines give results which are often mediocre as regards the way in which the cutting line is produced.

This is because during the cutting operation, the matter (asphalt pavement) is thrown out onto the surface of the ground, on either side of the rotary disk, thus leaving deposits of matter on both sides of the disk, and this requires a subsequent operation to gather up the deposits, which operation is always painstaking and expensive.

What is more, because of the very nature of the matter being cut, the edges of the cutting line are often uneven and ragged, which means that a cutting line of mediocre quality is obtained.

Furthermore, the cutting disk has at its periphery teeth which deteriorate as they wear, and this means that the cutting disk has to be replaced relatively frequently.

The object of the present invention is to overcome these drawbacks.

To achieve this, the machine for making grooves in the ground, said machine comprising a rotary disk connected to a mobile chassis, is noteworthy:

in that it comprises:
  a base plate which can be pressed against the ground, said base being arranged orthogonally to the plane of said disk and being provided with a longitudinal space through which a segment of said disk can pass to make said groove, the lateral edges of said longitudinal space being close to the lateral faces of said disk and said base plate preventing the matter from the grooves from being thrown outward;
  means bearing on said chassis and firmly pressing said base plate and said disk against the ground; and
in that said disk is mounted so that it can rotate freely, the rotational drive of said disk being provided by contact thereof with the ground when said mobile chassis moves along, so that a recess that corresponds to said groove is made in the ground, without the removal of matter.

Thus, since the base plate of the machine is pressing down on the ground (asphalt pavement) and tightly frames the rotary disk, matter from the pavement is prevented from being thrown outward and has to be compressed into the bottom and into the side walls of the line created by the action of the peripheral segment of the disk, projecting from the base and penetrating the ground. In addition, the disk does not work like a conventional cutting disk causing matter to be thrown outward, but like a disk that penetrates the matter to force it to compress without upsetting it outward thanks to the base plate, so that the groove can be obtained. The rotary disk constitutes a "model" which, once it has passed by, creates a "cavity" in the ground, corresponding to said groove, which is therefore not strictly speaking a cutting line. A groove of this kind may have a width of a few millimeters and a depth of a few centimeters.

Thus, the machine according to the invention does not cause deposits on the outside and makes it possible to obtain a perfectly clean groove in which optical cables, for example, can be laid.

As a preference, said disk has a continuous peripheral edge devoid of teeth, which plays a part in ensuring that the disk has excellent longevity.

Advantageously, at least one vibrator is associated with said disk, so as to assist with the action of making the latter penetrate the ground.

In addition, said longitudinal space is preferably made more or less at the middle of said base plate.

According to a first embodiment, said base plate may consist of a shoe capable of pressing on the ground and having a slot which corresponds to said longitudinal space for the passage of said rotary disk.

According to a second embodiment, said base plate may consist of two twin tracks which can press down on the ground and are spaced apart parallel to one another by a distance that corresponds to said longitudinal space for the passage of said rotary disk.

When, as is the case with the machine in document DE-A-30 22 317, the machine of the invention is moved along by hand by an operator, said means of applying said base plate and the disk against the ground may be provided by the operator himself. However, in the case of a motorized machine, it is advantageous for said application means to be actuating members such as rams.

The chassis may be made up of a stationary part and of a mobile part which are articulated together, said mobile part being connected to said base plate, and said disk is mounted on a shaft which is free to rotate and borne by bearings which are associated with a support connected to said mobile part. In this case, said pressing means comprise at least one such actuating member connecting said stationary part and mobile part of the chassis and allowing said mobile part to occupy a lowered position and a raised position for which positions said base and said disk are respectively either pressed against the ground or held away therefrom.

According to other features, the machine comprises:
  means for adjusting the depth of groove made by the rotary disk, by relative displacement of the base plate with respect to a support bearing said disk; and
  means for adjusting the force with which said disk penetrates the ground, with respect to said base plate.

The figures of the appended drawing will make it easy to understand how the invention may be achieved. In these figures, identical references denote similar elements.

FIG. 1 depicts a vehicle equipped with a machine in accordance with the invention.

FIG. 2 is a side elevation with partial cutaway of the machine illustrated in FIG. 1, in the process of producing a groove.

FIG. 3 is a view from above of the machine illustrated in FIG. 2.

FIG. 4 illustrates, in enlarged cross section, the action of the disk on the pavement to obtain the groove in accordance with the present invention.

FIG. 5 depicts the vehicle of FIG. 1 equipped with a machine according to an alternative form.

FIGS. 6 and 7 are respectively a side elevation and a view from above of the machine illustrated in FIG. 5.

The vehicle 1 depicted in FIG. 1 is equipped with a machine 2 making it possible to produce a groove L in the ground S. In this example, the machine 2 is mounted stationary at the front of the chassis 1A of the vehicle, but it could be set out at the rear of the chassis as depicted in chain line. To make it easier to steer the motor vehicle 1 and thus allow the groove L to be produced absolutely right, a device 3 for assisting with checking the desired path is coupled to the front of the chassis 1A, said device 3 bearing a swiveling wheel 3A at its free end.

The machine 2 comprises a disk 4 connected to a chassis 5 of the machine, which chassis is fixed to the chassis 1A of the vehicle. According to the invention, the machine 2 is fitted with a base plate 6 pressing against the ground S, such as the asphalt pavement of a road. This base 6 is set out orthogonally to the plane of the disk, which itself is generally vertical. It has a longitudinal space 7 which is parallel to the plane of the disk, so that a segment SD of the latter projects beneath the base to allow the groove L to be made, and of which the lateral edges delimiting said space are advantageously placed close to the lateral faces 4A of the disk.

In the embodiment depicted in FIGS. 2 to 4, the base plate 6 is shaped into a shoe 8 (or sole plate) which has a longitudinal slot 9 up the middle acting as the aforementioned longitudinal space 7. It can be seen from FIGS. 2 and 3 that the segment SD of the disk 4 passes through the slot 9 to protrude under the shoe by an amount that corresponds to the depth P of the groove. In particular, it can be seen from FIG. 4, that the lateral edges 8A delimiting the slot 9 are more or less flush with the lateral faces 4A of the disk, so that such an arrangement prevents debris caused by the production of the groove from being pushed up, thus forcing the matter to be compressed.

Furthermore, the disk 4 is associated removably with a shaft 10 mounted so that it can rotate freely about its axis and housed at its ends in bearings 11. These bearings are connected to a support 12 which thus bears the disk/shaft assembly. The peripheral edge 4B of the disk is moreover devoid of teeth. The rotational drive of the disk takes place through its contact with the ground. To facilitate the penetration of the disk in the ground, a vibrator 13, for example of the hydraulic type, is provided on the support 12. This is mounted on two rods 14 standing perpendicular to, and on the shoe and connected thereto, said rods being situated respectively at the front and at the rear of the shoe, in the plane of the disk and framing the latter.

As regards the chassis 5 of the machine, it is composed of a part 5A which is fixed to the front 1A of the vehicle, and of a mobile part 5B, articulated to the stationary part 5A. In particular, the stationary part 5A is in the shape of a U, between the legs of which two lateral parallel arms 5C of the mobile part are mounted about a pivot point 15 parallel to the shaft 10 bearing the disk. At the opposite end to their connection to the stationary part, the lateral arms 5C are connected to respective fittings 8B of the shoe about a pivot point 16 parallel to the pivot point 15. At least one cross member 5D firmly connects the two arms in order to stiffen the mobile part 5B of the chassis.

To press the shoe 8 and the disk 4 down firmly against the ground, actuating members such as rams 17 have been provided. These actuating members are arranged respectively one on either side of the chassis 5 and they are connected at one end to the stationary part 5A of the chassis by pins 18 and, at the other end, to the lateral arms 5C of the moving part 5B, by pins 19. As FIG. 2 shows, the mobile part 5B of the chassis occupies a lowered position corresponding to the rods of the rams being deployed, so that the shoe and the disk are pressed firmly against the pavement to be cut. The raised position of the mobile part of the chassis, following the retraction of the ram rods, is partially illustrated in chain line in FIG. 2.

Furthermore, the machine is also equipped with means 20 for adjusting the force with which the disk 4 penetrates the ground and with means 21 for adjusting the depth of the groove L to be obtained. In this embodiment, these means are provided at the rods 14 on which the support 12 of the disk 4 is mounted. Thus, a threaded ring 22 is arranged between each rod and a corresponding internal passage 12A of the support so that action on these two rings 22 which form nuts causes a relative displacement between the shoe 8 and the support 12 and therefore varies the projection of the disk segment SD to suit the desired depth P of the groove. A screw 23 is also screwed into the free upper end of each rod 14 and elastic elements 24, such as elastic washers of the Belleville type, are arranged around the rod, in particular between the depth-adjustment ring 22 and the screw 23. These screws 23 allow the elastic washers 24 to be compressed to greater or lesser extents and therefore have an influence on the force with which the disk penetrates the pavement with respect to the shoe in contact with this pavement.

The way in which the machine 2, mounted on the front or on the rear of the chassis of the vehicle, works is as follows.

The machine 2 occupies the position indicated in FIGS. 1 and 2, for which the shoe 8 and the disk 4 are pressed against the pavement R under the action of the rams 17, which are moreover connected to pressure accumulators, not depicted, and allow the shoe to rest effectively on the pavement R of the ground. The adjustments relating to the desired depth of the groove and the force with which the disk penetrates the ground are also made.

As the vehicle 1 moves forward, guided by the aid device 3, the disk 4 is rotationally driven by its contact (frictional) with the ground at its segment SD which protrudes beneath the shoe 8, opening a groove L. The operation of the vibrator 13 also plays an active part in engaging the disk segment SD in the ground. As shown more specifically in FIG. 4, the matter of which the road pavement is made, such as asphalt, is forced to compress by the action of the lateral faces 4A and of the peripheral edge 4B of the disk, and by the presence of the lateral edges 8A of the slot, which are close to the faces 4A and prevent the matter from being thrown out (or upset outward). Thus this matter is compressed (compacted) gradually in the bottom FD and in the lateral faces FL of the groove L as the vehicle 1 advances. Thus, once the disk has passed, a perfectly clean groove L is obtained behind the machine, with no thrown-out deposit to be gathered up, and which is ready for the laying of elongate objects, such as optical cables. The cross section of the groove L therefore corresponds appreciably to the cross section of the active segment SD of the disk penetrating the pavement. Furthermore, and because of the nature of the matter, the cutting disk experiences practically no wear.

In an alternative form of machine, illustrated in FIGS. 6 and 7, the base plate 6 is defined from two twin tracks 26 arranged parallel to one another and respectively one on either side of said disk 4. The distance D separating the facing internal edges 26A of the lower lengths 26B of the two tracks 26 corresponds to the aforementioned longitudinal space 7 allowing the disk to pass freely between the tracks. This distance D is relatively close to the thickness of the disk, which means that here too the matter being dug cannot be thrown out, just like in the case of the shoe 8 with a slot 9 in it.

The chassis 5 of the machine 2 is similar to the one described earlier, except that the free ends of the arms 5C bear the ends of the shaft 10 of the said disk 4. The structures 27 over which the tracks 26 run are fixed to plates 12B of the support 12 bearing the shaft 10 and the disk 4, by screws 28. The supports can slide relatively on the structures 27 to allow adjustment of the depth of the groove to be produced.

The vehicle 1 illustrated in FIG. 5 is equipped with the machine 2 with tracks 26 described hereinabove which is fixed, for example, under the chassis 1A of the vehicle between the two axles.

By way of example, the groove made may be 25 mm deep by 10 mm wide.

Furthermore, the vehicle 1 depicted in FIGS. 1 and 5 may be equipped with a drum around which the cable to be laid is wound and allowing the cable to be laid in the groove once the latter has been produced. In this case, a sand hopper and a pitch boiler may also be associated with the vehicle in order to cover the slot after the cable has been laid. Thus, with just one vehicle, the groove can be made, the cables can be laid and the groove can be filled in. A rotary brush may also be mounted ahead of the machine 2 under the chassis of the vehicle which allows the best possible cleaning of the pavement before the passage of the machine.

I claim:

1. A machine for making grooves in the ground, said machine comprising:
   (a) a rotary disk connected to a mobile chassis and having a continuous peripheral edge devoid of teeth, said disk being mounted freely rotatable, the rotational drive of said disk being provided by contact thereof with the ground when said mobile chassis moves along;
   (b) at least one vibrator acting on said disk, said disk penetrating the ground while forcing the matter to be compressed into the bottom and into the side walls of the grooves;
   (c) a base plate which can be applied with pressure against the ground, said base plate being arranged orthogonally to the plane of said disk and being provided with a longitudinal space through which a segment of said disk can pass to make said grooves, the lateral edges of said longitudinal space being close to the lateral faces of said disk; and
   (d) means bearing on said chassis and firmly pressing said disk and said base plate against the ground, said base plate preventing the matter from the grooves from being thrown outward when said base plate is pressed against the ground.

2. The machine as claimed in claim 1, wherein said longitudinal space (7) is made approximately in the middle of said base plate (6).

3. The machine as claimed in claim 1, wherein said base plate (6) consists of at least one shoe (8) capable of pressing on the ground and having a slot (9) which corresponds to said longitudinal space (7) for the passage of said rotary disk (4).

4. The machine as claimed in claim 1, wherein said base plate (6) consists of two twin tracks (26) which can press down on the ground and are spaced apart parallel to one another by a distance that corresponds to said longitudinal space (7) for the passage of said rotary disk (4).

5. The machine as claimed in claim 1, wherein said means of applying said base plate (6) and the disk against the ground are actuating members (17).

6. The machine as claimed in claim 1, wherein said chassis (5) is made up of a stationary part (5A) and of a mobile part (5B) which are articulated together, said mobile part being connected to said base plate (6), and wherein said disk (4) is mounted on a shaft (10) which is free to rotate and borne by bearings which are associated with a support (12) connected to said mobile part (5B).

7. The machine as claimed in claim 5, wherein said pressing means comprise at least one such actuating member (17) connecting said stationary part (5A) and mobile part (5B) of the chassis and allowing said mobile part (5B) to occupy a lowered position and a raised position for which positions said base (6) and said disk (4) are respectively either pressed against the ground or held away therefrom.

8. The machine as claimed in claim 1, which comprises means (21) for adjusting the depth of the groove made by the rotary disk, by relative displacement of the base plate with respect to a support bearing said disk.

9. The machine as claimed in claim 1, which comprises means (20) for adjusting the force with which said disk penetrates the ground, with respect to said base plate.

10. The machine as claimed in claim 5, wherein the actuating members are rams.

11. A method for making in the ground a groove capable of accommodating a cable or an object having approximately the same size and shape as a cable, which consists of
   (a) making a groove in the ground, without removing matter, with a vibrated disk mounted to rotate freely with regard to a base plate pressed against the ground and preventing the matter from the groove from being thrown outward, the rotational drive of said disk being provided by the mobile contact, under pressure, of said disk with the ground; and
   (b) laying said cable in said groove.

* * * * *